US006688603B2

United States Patent
vom Schemm

(10) Patent No.: US 6,688,603 B2
(45) Date of Patent: Feb. 10, 2004

(54) RADIAL SHAFT SEALING RING

(75) Inventor: Michael vom Schemm, Reinfeld (DE)

(73) Assignee: Dichtungstechnik G. Bruss GmbH & Co., Hamburg (DE)

(*) Notice: Subject to any disclaimer, the term of this patent is extended or adjusted under 35 U.S.C. 154(b) by 10 days.

(21) Appl. No.: 10/077,764

(22) Filed: Feb. 20, 2002

(65) Prior Publication Data

US 2002/0117810 A1 Aug. 29, 2002

(30) Foreign Application Priority Data

Feb. 27, 2001 (DE) .......................... 101 09 320

(51) Int. Cl.[7] ............................... F16J 15/32
(52) U.S. Cl. ................. 277/553; 277/549; 277/556; 277/559; 277/562
(58) Field of Search ................. 277/549, 553, 277/556, 559, 562

(56) References Cited

U.S. PATENT DOCUMENTS

| 4,623,153 A | * | 11/1986 | Nagasawa ................. 277/551 |
| 4,844,485 A | * | 7/1989 | Antonini et al. ............ 277/553 |
| 5,056,799 A | * | 10/1991 | Takenaka et al. .......... 277/562 |
| 5,149,106 A | | 9/1992 | Takenaka et al. |
| 6,047,970 A | * | 4/2000 | Friend et al. ............... 277/550 |
| 6,079,715 A | * | 6/2000 | Johnen et al. .............. 277/565 |

FOREIGN PATENT DOCUMENTS

| DE | 3607662 | 3/1985 |
| DE | 3327229 | 9/1987 |

OTHER PUBLICATIONS

Toth, D.M., Hatch, F., & & Upper, G., "Advanced Analytical Techniques for the Optimization of PTFE Seals", pp. 1–9, SAE Technical Paper 930531. Int'l Congress and Exposition; Detroit, MI; Mar. 1–5, 1993.

* cited by examiner

Primary Examiner—Lynne H. Browne
Assistant Examiner—Enoch E Peavey
(74) Attorney, Agent, or Firm—Duane Morris LLP

(57) ABSTRACT

A radial shaft sealing ring, comprising a sealing member made of plastics, especially PTFE compound material, and including a sealing lip which has a portion in sealing engagement with the surface of a shaft towards the medium side is characterized in that a contact pressure means is provided at the medium side of the sealing lip for applying a force with a radially inwardly directed component to said portion of the sealing lip, keeping it pressed against the surface of the shaft.

12 Claims, 1 Drawing Sheet

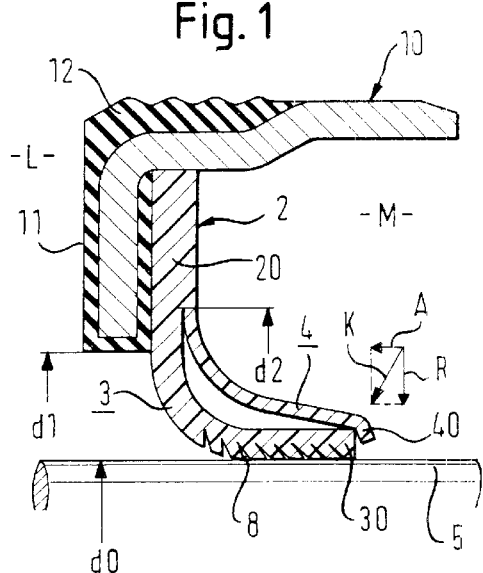
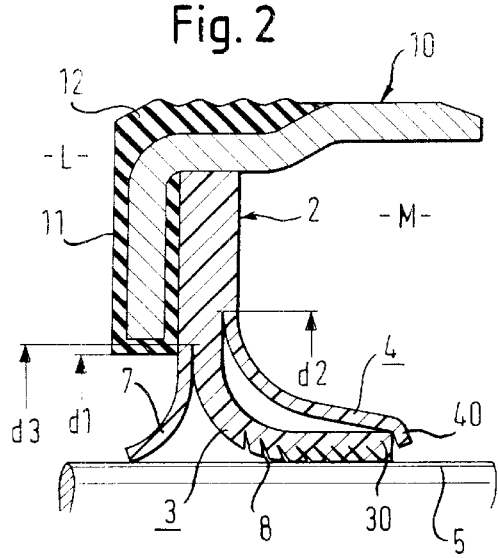
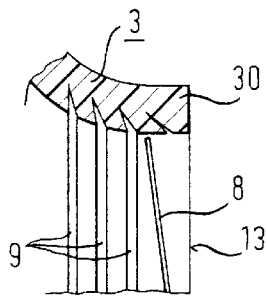
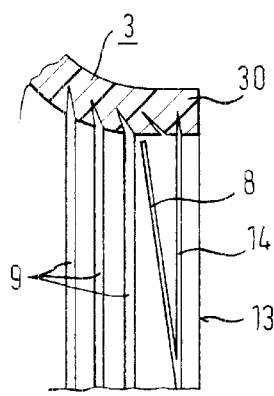
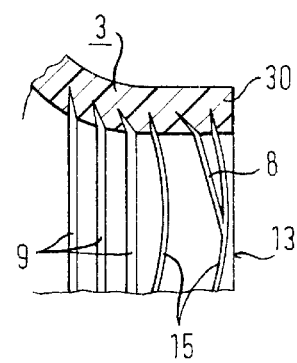
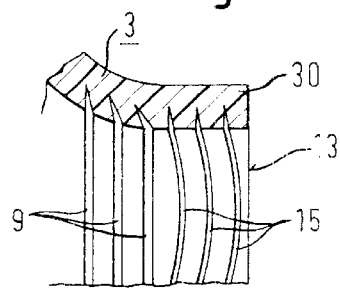
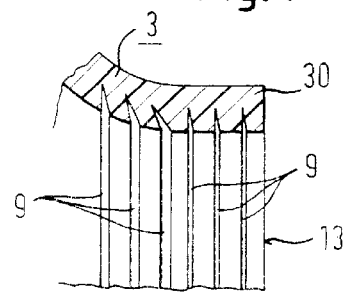

RADIAL SHAFT SEALING RING

The invention relates to a radial shaft sealing ring as recited in the preamble of claim 1.

When radial shaft sealing rings of the kind in question are mounted their sealing lip which is oriented radially inwardly in unassembled condition is bent elastically in axial direction so that its free end will enter into axial engagement with the surface of the shaft (cf. SAE Technical Paper 930531 "Advanced Analytical Techniques of the Optimization of PTFE Seals", D. M. Toth, R. Hatch, G. Upper). Measurements and calculations have revealed that the place of maximum contact pressure of the sealing lip against the shaft surface is shifted towards the side of the air and that there is practically no contact pressure acting on the free end of the sealing lip. As a result, the sealing lip may lift off, especially when there is excessive pressure in the space to be sealed. This phenomenon is referred to in the art as "bell mouthing".

DE 33 27 229 A1 discloses a radial shaft sealing ring of the kind mentioned initially of which the sealing lip is partly split by circular, continuous ring cuts so as to enhance its flexibility.

It is the object of the invention to design a radial shaft sealing ring of the kind defined in the preamble of claim 1 such that contact pressure of the sealing ring throughout the entire area in engagement with the surface is securely warranted even when high pressure exists in the space to be sealed.

This object is met by a shaft seal as defined in claim 1 and a method of making the same as defined in claim 13.

The contact pressure means of the present invention which preferably does not touch the shaft and, if so, engages it without exerting a force thereon, keeps the sealing lip, preferably the free end thereof constantly pressed against the surface of the shaft by subjecting it to a force with a radially inwardly directed component. In this manner the undesirable "bell mouthing" and thus the risk of leakage are avoided. That is true in particular also in cases of application where the pressure in the sealed space, is higher than the pressure at the so-called air side, namely ambient pressure, for example atmospheric pressure.

The contact pressure means preferably is an elastic contact pressure lip which is integral with the sealing member and formed by radial slitting or splitting. It exerts the pressure mentioned on the free end of the portion of the sealing lip. Due to its manufacture, this contact pressure lip, before being mounted, preferably has the same inner diameter as the sealing lip. Upon assembly, the contact pressure lip automatically adjusts itself so that it will contact the sealing lip only at the free end thereof and will not touch the shaft.

Further advantageous embodiments of the invention are covered by the subclaims. It is known to provide the surface area of the sealing lip, especially where it engages the shaft with feedback structures embodied, for example, by spiral grooves (SAE Technical Paper 930531, FIG. 1, see above). Such grooves are open towards the space to be sealed so as to be able to return any medium which enters the sealing gap back into the space to be sealed. When there is excess pressure in the space to be sealed it may happen that medium to be kept sealed off is pressed in opposite direction through the groove or grooves thus penetrating the sealing gap and leaking from the sealed space into the surroundings.

To prevent that from happening, it is provided in a further development of the invention which is important also in itself that the feedback structure is closed towards the medium side and/or the air side.

Preferred embodiments of the invention will be described in greater detail below with reference to diagrammatic drawings, in which:

FIG. 1 is a radial semisectional view of a first embodiment of a radial shaft sealing ring according to the invention;

FIG. 2 is a radial semisectional view similar to FIG. 1 of a modified radial shaft sealing ring according to the invention;

FIGS. 3 to 7 each are part sectional views of modified radial shaft sealing rings according to the invention as illustrated in FIGS. 1 and 2, the shaft indicated in those figures being omitted and only part of the sealing lip of the radial shaft sealing ring being shown.

The radial shaft sealing rings illustrated in FIGS. 1 and 2 are shown mounted on a shaft 5. They each comprise a sealing member 2 made of PTFE compound material. The radially inner end of the sealing member 2 is slitted radially from the inside to the outside to form a sealing lip 3 and a contact pressure lip 4. The sealing lip 3 is thicker than the contact pressure lip 4 and is bent elastically from the radial direction into axial direction so that its radially innermost portion 30 is in sealing surface area contact with the surface of the shaft 5. Reference numeral 8 designates a feedback structure embodied by a single or multiple thread spiral groove which terminates before the free end of portion 30. In other words, it is closed toward the medium side M.

The thinner contact pressure lip 4 in the embodiments shown rest with its free end 40 on the free end of portion 30, applying pressure on the same approximately in the direction of arrow K (FIG. 1). Force K which comprises a radial component R and an axial component A results from the elastic resistance of the contact pressure lip caused by its bending from the radial direction (in unmounted condition).

This force K has the effect that, in operation, portion 30 of sealing lip 3 cannot lift off the surface of the shaft 5 even if the pressure at the medium side M is in excess of the atmospheric pressure at the air side L of the seal. Bell mouthing and any consequential leakage, therefore, are prevented. Nor can there be leakage through the spiral groove 8 because the groove is closed at least towards the medium side M.

It may be seen in FIG. 1 that the sealing member 2 is attached, e.g. bonded by its radial portion 20 to a radial leg 11 of a support body indicated in general by reference numeral 10 and embodied by a ring made of steel, aluminum or rigid plastics. As shown, the radial leg 11 may be provided with a coat 12 of an elastomeric material which is corrugated on its radially outer side to allow the component to be securely pressed into a bore in a casing or the like.

As may be seen, the inner diameter d1 is greater than the diameter d0 of the shaft 5. It is clear from FIGS. 1 and 2 that, on the other hand, the slit diameter d2 is greater than the diameter d1. The diameter d2 may be in the range between diameters d1 and 2d1. In this range it is assured that, once separated from a PTFE tube and having had its sealing lip 3 slitted radially, the sealing member 2 will assume the configuration shown in FIGS. 1 and 2. In this condition, only the end 40 of the contact pressure lip 4 will press the sealing lip down against the surface of the shaft 5 by exerting pressure K on portion 30. The contact pressure lip 4 does not touch the shaft 5. The free end 40 of the contact pressure lip 4 is pulled down as illustrated by radial tensions, and this automatically produces the radial inward bending of portion 40.

The embodiment according to FIG. 2 differs from the one shown in FIG. 1 in that an additional protective lip 7 is formed, likewise by radial slitting or splitting of the sealing member 2 from the inside to the outside up to a diameter d3. This diameter preferably likewise is greater than diameter d1 of the radial leg 11. As a consequence, the sealing lip 3 engages the surface of the shaft 5 not only in line contact but throughout an area.

Modified embodiments of the sealing lip 3 described with reference to FIGS. 1 and 2 are shown in detail in FIGS. 3 to 7.

In the sealing lip 3 according to FIG. 3 the feedback structure 8 is embodied by an oblique groove or a spiral groove which extends almost up to the closed edge 13 of portion 30 of the sealing lip 3 but does not break through the same. Therefore, pressurized medium from the medium side M cannot be pressed into the groove 8. To the left of groove 8 in FIG. 3 three concentric cuts 9 are to be seen. They merely serve to increase the flexibility of the sealing lip 3 and thus its ability to follow static and dynamic displacements of the shaft 5.

All the other modifications according to FIGS. 4 to 7 likewise are provided with such cuts 9 in the sealing lip. However, the feedback structures 8 of these modifications are different.

For instance, in FIG. 4 the oblique or spiral groove 8 opens into a radial groove 14 located adjacent to the sealing edge 13 in the direction towards the medium side M.

Inclined grooves or spiral grooves 8 as specified in FIGS. 1 to 5 are suitable only for a feedback structure which is effective exclusively in one direction of rotation. If the shaft were to rotate in a direction opposite to the normal direction such grooves 8 even would provoke additional leakage.

One or more sinusoidal or similar grooves 15 are provided in the embodiments according to FIGS. 5 and 6. They present feedback structures which operate in both rotary directions of the shaft. In the embodiment of FIG. 5 an additional oblique groove 8 is shown which has a feedback effect in only one direction of rotation, e.g. the principal direction of rotation.

FIG. 7, finally, shows a modification of the sealing lip 3 which has only concentric cuts 9. This construction, too, has a feedback effect albeit small. It is brought about by dynamic lifting of the "sealing edge"—that position of the area of the sealing lip 3 in surface contact with the shaft 5 which is pressed into contact with the surface of the shaft 5 under maximum contact pressure—due to so-called "pushing" of the sealing lip 3 in axial direction when shafts 5 are not installed precisely concentrically or run out of true.

The features disclosed in the specification above, in the claims and drawings may be essential to implementing the invention in its various embodiments, both individually and in any desired combination.

What is claimed is:

1. A radial shaft sealing ring, comprising a sealing member made of plastic, which includes a sealing lip having a portion in sealing engagement with the surface of a shaft towards the medium side and extending from a root made of the same material, wherein a contact pressure means is provided at the medium side of the sealing lip to exert a force with a radially inwardly directed component on the portion of the sealing lip keeping it pressed against the surface of the shaft, wherein the contact pressure means is an elastic contact pressure lip which is integral with the sealing member and extends from said root and exerts said force on the free end of the portion of the sealing lip; and, the sealing lip and the contact pressure lip are made from the same material, wherein the contact pressure lip has a uniform thickness.

2. The radial shaft sealing ring as claimed in claim 1, wherein the contact pressure means does not touch the surface of the shaft.

3. The radial shaft sealing ring as claimed in claim 1, wherein the thickness of the contact pressure lip at most is as great as that of the sealing lip.

4. The radial shaft sealing ring as claimed in claim 1, wherein the sealing member is attached to a radial leg of a support body and that the diameter up to which the sealing member is slit radially is at least as great and at most twice as great as the inner diameter of the radial leg.

5. The radial shaft sealing ring as claimed in claim 4, wherein the sealing member at the air side includes a protective lip formed by radial slitting of the sealing member from the inside to the outside up to a diameter which is the same as or greater than the inner diameter of the radial leg.

6. The radial shaft sealing ring as claimed in claim 1, wherein the sealing lip includes a feedback structure at its portion engaging the surface of the shaft, said feedback structure being closed toward the medium side and/or the air side.

7. The radial shaft sealing ring as claimed in claim 6, wherein the feedback structure comprises a single or multiple thread spiral groove.

8. The radial shaft sealing ring as claimed in claim 6, wherein the feedback structure comprises at least one oblique rectilinear cut.

9. The radial shaft sealing ring as claimed in claim 6, wherein the feedback structure comprises at least one sinusoidal cut.

10. The radial shaft sealing ring as claimed in claim 1, wherein parallel concentric cuts are formed in the portion of the sealing lip facing the surface of the shaft.

11. A method of making a radial shaft sealing ring as claimed in claim 1, wherein
   the sealing member is severed in a plane from a tube,
   the sealing member is slitted radially from the inside to the outside to form the sealing lip and the contact pressure lip,
   the sealing member is connected at the sealing lip side to a radially extending leg of a support body, and
   the sealing lip and the contact pressure lip are bent in axial direction, wherein the contact pressure lip forces the sealing lip inward.

12. The radial shaft sealing ring as claimed in claim 1, wherein the plastic is a PTFE compound material.

* * * * *